(12) United States Patent
Lu

(10) Patent No.: US 9,470,882 B2
(45) Date of Patent: Oct. 18, 2016

(54) OPTICAL ARRANGEMENT FOR A SOLID-STATE LAMP

(75) Inventor: Dong Lu, Cary, NC (US)

(73) Assignee: Cree, Inc., Durham, NC (US)

( * ) Notice: Subject to any disclaimer, the term of this patent is extended or adjusted under 35 U.S.C. 154(b) by 1164 days.

(21) Appl. No.: 13/093,085

(22) Filed: Apr. 25, 2011

(65) Prior Publication Data

US 2012/0268930 A1    Oct. 25, 2012

(51) Int. Cl.
| | |
|---|---|
| *G02B 19/00* | (2006.01) |
| *F21K 99/00* | (2016.01) |
| *F21V 5/00* | (2015.01) |
| *F21V 5/04* | (2006.01) |
| *F21V 7/00* | (2006.01) |
| *F21V 7/22* | (2006.01) |
| *F21Y 101/02* | (2006.01) |

(52) U.S. Cl.
CPC ........... *G02B 19/0066* (2013.01); *F21K 9/137* (2013.01); *F21V 5/007* (2013.01); *F21V 5/04* (2013.01); *F21V 7/0083* (2013.01); *F21V 7/0091* (2013.01); *G02B 19/0028* (2013.01); *F21V 7/22* (2013.01); *F21Y 2101/02* (2013.01); *Y10T 29/49117* (2015.01)

(58) Field of Classification Search
CPC . G02B 19/0066; G02B 19/0028; F21V 5/04; F21V 7/0091; F21V 5/007; F21V 7/0083; F21V 7/22; F21K 9/137; Y10T 29/49117; F21Y 2101/02
USPC ................................................ 362/97.1–97.4
See application file for complete search history.

(56) References Cited

U.S. PATENT DOCUMENTS 3,581,162 A    5/1971   Wheatley
4,714,983 A *  12/1987  Lang ................................ 362/27
(Continued)

FOREIGN PATENT DOCUMENTS

| EP | 1058221 A2 | 12/2000 |
|---|---|---|
| EP | 0890059 B1 | 6/2004 |

(Continued)

OTHER PUBLICATIONS

Cree, Inc., International Application No. PCT/US2012/033427, International Search Report and Written Opinion, Jun. 13, 2012.
(Continued)

*Primary Examiner* — Stephen F Husar
*Assistant Examiner* — Danielle Allen
(74) *Attorney, Agent, or Firm* — Steven B. Phillips; Moore & Van Allen PLLC

(57) ABSTRACT

An optical arrangement for a solid-state lamp is disclosed. A highly reflective secondary reflector is located adjacent to but not in contact with an optical element. In some embodiments, the reflector presents a white, diffuse reflective surface. A secondary reflector with a specular reflective surface can also be used. The secondary reflector can be made of various commercially available materials; for example, MCPET or polycarbide resin, and the arrangement can be used with an LED light source. In some example embodiments, the optical element and the highly reflective secondary reflector each have a plurality of lobes and the arrangement is suitable for an MR16 halogen lamp replacement. In other example embodiments, the highly reflective secondary reflector includes a plurality of recesses corresponding to a plurality of optical elements, and the arrangement is suitable for a PAR incandescent bulb replacement.

36 Claims, 6 Drawing Sheets

(56) References Cited

U.S. PATENT DOCUMENTS

| | | |
|---|---|---|
| 5,463,280 A | 10/1995 | Johnson |
| 5,561,346 A | 10/1996 | Byrne |
| 5,585,783 A | 12/1996 | Hall |
| 5,655,830 A | 8/1997 | Ruskouski |
| 5,688,042 A | 11/1997 | Madadi et al. |
| 5,806,965 A | 9/1998 | Deese |
| 5,947,588 A | 9/1999 | Huang |
| 5,949,347 A | 9/1999 | Wu |
| 6,220,722 B1 | 4/2001 | Begemann |
| 6,227,679 B1 | 5/2001 | Zhang et al. |
| 6,234,648 B1 | 5/2001 | Borner et al. |
| 6,250,774 B1 | 6/2001 | Begemann et al. |
| 6,276,822 B1 | 8/2001 | Bedrosian et al. |
| 6,465,961 B1 | 10/2002 | Cao |
| 6,523,978 B1 | 2/2003 | Huang |
| 6,550,953 B1 | 4/2003 | Ichikawa et al. |
| 6,634,770 B2 | 10/2003 | Cao |
| 6,659,632 B2 | 12/2003 | Chen |
| 6,709,132 B2 | 3/2004 | Ishibashi |
| 6,803,607 B1 | 10/2004 | Chan et al. |
| 6,814,470 B2 * | 11/2004 | Rizkin et al. .................. 362/327 |
| 6,848,819 B1 | 2/2005 | Arndt et al. |
| 6,864,513 B2 | 3/2005 | Lin et al. |
| 6,948,829 B2 | 9/2005 | Verdes et al. |
| 6,982,518 B2 | 1/2006 | Chou et al. |
| 7,048,412 B2 | 5/2006 | Martin et al. |
| 7,080,924 B2 | 7/2006 | Tseng et al. |
| 7,086,756 B2 | 8/2006 | Maxik |
| 7,086,767 B2 | 8/2006 | Sidwell et al. |
| 7,144,135 B2 | 12/2006 | Martin et al. |
| 7,165,866 B2 | 1/2007 | Li |
| 7,172,314 B2 | 2/2007 | Currie et al. |
| 7,213,940 B1 | 5/2007 | Van De Ven et al. |
| 7,354,174 B1 | 4/2008 | Yan |
| 7,396,142 B2 | 7/2008 | Laizure, Jr. et al. |
| 7,540,616 B2 * | 6/2009 | Conner ........................... 353/20 |
| 7,600,882 B1 | 10/2009 | Morejon et al. |
| 7,726,836 B2 | 6/2010 | Chen |
| 7,824,065 B2 | 11/2010 | Maxik |
| 8,021,025 B2 | 9/2011 | Lee |
| 8,253,316 B2 | 8/2012 | Sun et al. |
| 8,272,762 B2 | 9/2012 | Maxik et al. |
| 8,274,241 B2 | 9/2012 | Guest et al. |
| 8,277,082 B2 | 10/2012 | Dassanayake et al. |
| 8,282,250 B1 | 10/2012 | Dassanayake et al. |
| 8,292,468 B2 | 10/2012 | Narendran et al. |
| 8,322,896 B2 | 12/2012 | Falicoff et al. |
| 8,371,722 B2 | 2/2013 | Carroll |
| 8,400,051 B2 | 3/2013 | Hakata et al. |
| 8,415,865 B2 | 4/2013 | Liang et al. |
| 8,421,320 B2 | 4/2013 | Chuang |
| 8,421,321 B2 | 4/2013 | Chuang |
| 8,421,322 B2 | 4/2013 | Carroll et al. |
| 8,449,154 B2 | 5/2013 | Uemoto et al. |
| 8,502,468 B2 | 8/2013 | Li et al. |
| 8,641,237 B2 | 2/2014 | Chuang |
| 8,653,723 B2 | 2/2014 | Cao et al. |
| 8,696,168 B2 | 4/2014 | Li et al. |
| 8,740,415 B2 | 6/2014 | Wheelock |
| 8,750,671 B1 | 6/2014 | Kelly et al. |
| 8,752,984 B2 | 6/2014 | Lenk et al. |
| 8,760,042 B2 | 6/2014 | Sakai et al. |
| 2002/0130326 A1 * | 9/2002 | Tamura et al. .................. 257/79 |
| 2003/0214615 A1 * | 11/2003 | Colgan et al. .................. 349/65 |
| 2004/0201990 A1 | 10/2004 | Meyer |
| 2004/0228131 A1 | 11/2004 | Minano et al. |
| 2009/0184618 A1 | 7/2009 | Hakata et al. |
| 2011/0215345 A1 * | 9/2011 | Tarsa et al. .................... 257/88 |
| 2012/0040585 A1 | 2/2012 | Huang |
| 2012/0081907 A1 * | 4/2012 | Kato et al. .................... 362/308 |

FOREIGN PATENT DOCUMENTS

| | | |
|---|---|---|
| EP | 2199661 A2 | 6/2012 |
| GB | 2345954 A | 7/2000 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2011094122 A2 | 8/2011 |
| WO | 2012011279 A1 | 1/2012 |
| WO | 2012031533 A1 | 3/2012 |

OTHER PUBLICATIONS

U.S. Appl. No. 12/776,799, filed May 10, 2010.

* cited by examiner

OPTICAL ARRANGEMENT FOR A SOLID-STATE LAMP

BACKGROUND

Light emitting diode (LED) lighting systems are becoming more prevalent as replacements for existing lighting systems. LEDs are an example of solid state lighting and have advantages over traditional lighting solutions such as incandescent and fluorescent lighting because they use less energy, are more durable, operate longer, can be combined in red-blue-green arrays that can be controlled to deliver virtually any color light, and contain no lead or mercury.

In many applications, one or more LED dies (or chips) are mounted within an LED package or an LED module, which may make up part of a lighting fixture which includes one or more power supplies to power the LEDs. Some lighting fixtures include multiple LED modules. A module or strip of a fixture includes a packaging material with metal leads (to the LED dies from outside circuits), a protective housing for the LED dies, a heat sink, or a combination of leads, housing and heat sink.

An LED fixture may be made with a form factor that allows it to replace a standard threaded incandescent bulb, or any of various types of fluorescent or halogen lamps. LED fixtures and lamps often include some type of optical elements external to the LED modules themselves. Such optical elements may allow for localized mixing of colors, collimate light, and/or provide a controlled beam angle.

Optical elements may include reflectors, lenses, or a combination of the two. Reflectors may be made of glass or plastic and function through the principle of total internal reflection (TIR) in which light reflects inside the optical element because it strikes an edge of the element at and angle, which is equal to or greater than the critical angle relative to the normal vector.

SUMMARY

Embodiments of the present invention include an optical arrangement for a solid-state lamp in which a highly reflective secondary reflector is located adjacent to but not in contact with a total internal reflection (TIR) optical element, which serves as a primary reflector. In some embodiments, the secondary reflector presents a white, diffuse reflective surface to light escaping from the curved surface, or being reflected back at the Fresnel interface of the optical element. This reflector is referred to as a secondary reflector because the exterior wall of the optical element serves as a primary reflector.

Although TIR optical elements internally reflect light from their curved surfaces to concentrate light, some stray light does escape through the internally reflective surfaces, and can be recaptured with an appropriately designed secondary reflector. Such an optical arrangement can be used to improve the efficiency of a solid-state lamp such as an LED lamp used to replace a standard incandescent or halogen lamp or bulb.

An optical arrangement according to example embodiments of the invention includes an optical element, and a highly reflective secondary reflector, substantially adjacent to and spaced apart from the sidewall of an optical element. In some embodiments, the optical element is a TIR optical element. In some embodiments, the TIR optical element has a curved sidewall. In some embodiments, the highly reflective secondary reflector is a diffuse white reflector, or a reflector with a diffuse white surface. In some embodiments, the secondary reflector is a specular reflector. In some embodiments the secondary reflector comprises thermoformable material. The secondary reflector can be made of any of various commercially available materials, for example, microcellular polyethylene terephthalate (MC-PET), or polycarbide resin.

In some embodiments, at least one of the TIR optical element and the highly reflective secondary reflector has a plurality of lobes. In some embodiments, the TIR optical element and the highly reflective secondary reflector each have three lobes. In some embodiments, the highly reflective secondary reflector includes a plurality of recesses corresponding to a plurality of TIR optical elements. The secondary reflector may have a surface with at least 85%, at least 92%, at least 95%, or at least 97% reflectivity.

An optical arrangement according to embodiments of the present invention can be used in a lamp including an LED light source. In such a case, the TIR optical element and the secondary reflector are placed so that light from the LED light source passes into the TIR optical element, which is disposed to receive and direct the light. The secondary reflector is positioned substantially adjacent to and spaced an airgap away from the curved sidewall of the TIR optical element. In some embodiments the lamp includes a power supply to power the LEDs.

In some embodiments, a plurality of LED light sources can be arranged in a pattern within a housing. Each LED light source may include a plurality of LED packages arranged in an array, where a package can include simply a single LED chip, an LED chip with a local phosphor, or a plurality of LED chips. In some embodiments, the three-lobed optical element and reflector previously mentioned can be used in a solid-state replacement for a standard, MR16 halogen lamp. In some embodiments, a reflector with recesses for multiple TIR optical elements can be used in a solid-state replacement lamp for a standard PAR incandescent bulb with an Edison base. Embodiments of the invention can be used in lamps of many different form factors.

DETAILED DESCRIPTION

Figure 1:
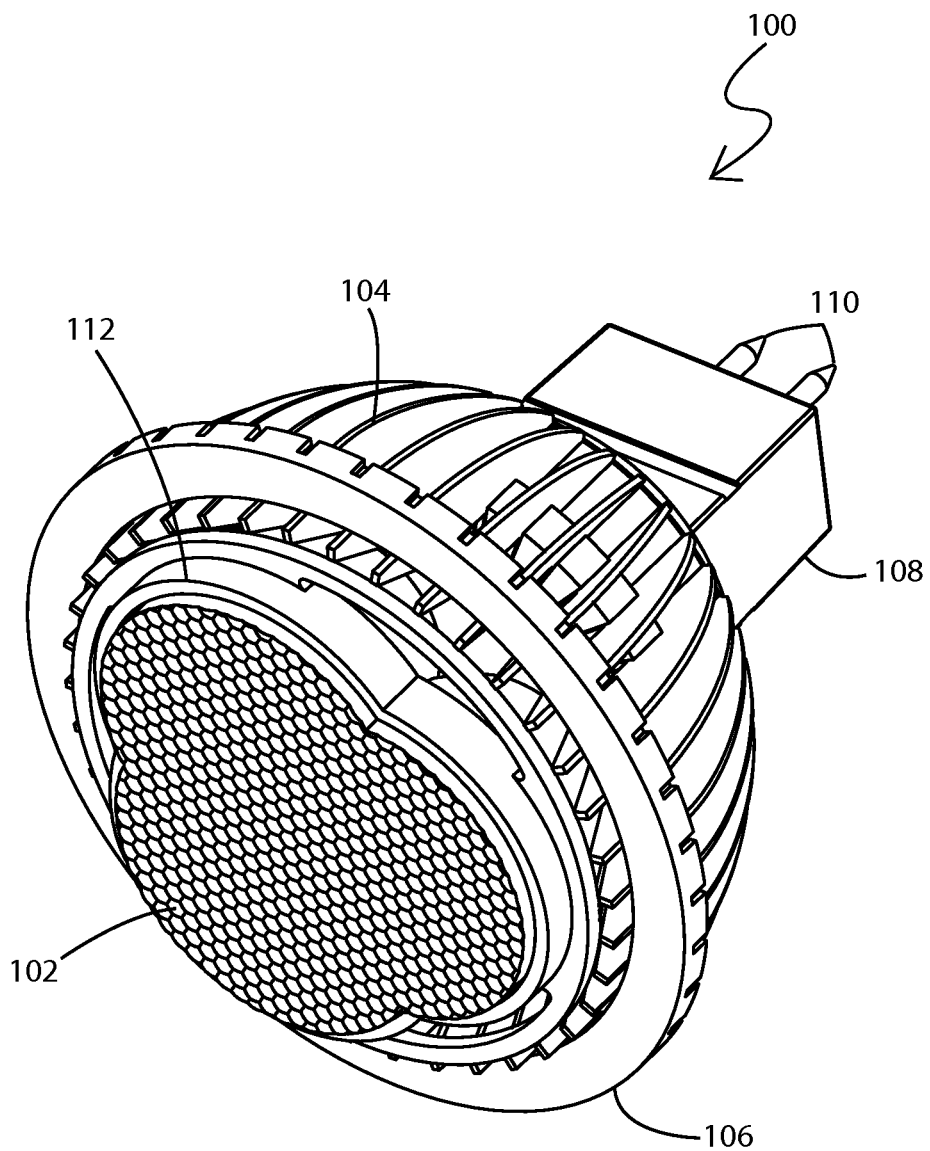
FIG. 1 is a perspective view of an LED lamp according to example embodiments of the invention. This particular LED lamp is intended to replace a standard MR16 halogen lamp.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

An optical element that exhibits total internal reflection (TIR), a "TIR optic" or "TIR optical element," may be used in solid-state lighting systems that require directional focus or collimation. A TIR optic is essentially a lens made of transparent material designed in such a way that light, once having entered into the transparent media, light encounters the side walls of the lens at angles greater than the critical angle, resulting in total internal reflection. Thus, a TIR optic can also serve as a reflector. Typical TIR optical elements include one or more entry surfaces, one or more exit surfaces, and a sidewall or outer surface that internally reflects light. The sidewall is often curved in shape, so that light rays hitting at various angles depending on where on the sidewall a ray is striking, will always be reflected at an angle greater than the critical angle. As one example, a TIR optic outer surface may have a conic shape as defined by the formula:

$$z = \frac{cr^2}{1 + \sqrt{1-(1-kc^2r^2)}},$$

where x, y and z are positions on a typical 3-axis system, k is the conic constant, and c is the curvature. For a parabolic shape, k is less than or equal to −1. However, it should be noted that the outer surface being curved, and indeed being conic is just an example of how an outer surface of a TIR optic might be shaped. A TIR optical element could be designed with outer surfaces of various shapes; for example, angled, arced, spherical, curved as well as segmented shapes.

TIR optical elements can be compact and include features on their exit surfaces to modify the light distribution. Such features might include, for example, color mixing treatment or diffusion coatings. However, despite the fact that these optical elements are referred to as total internal reflection optics, the TIR characteristics of such optical elements are of course not perfect. Light suffers absorption loss associated with the transparent resin. Typical absorption loss of a TIR optic is directly related to the material used to create it. Absorption loss in acrylic is around a few percent. In polycarbonate absorption loss is typically 5% more for a similarly sized optic. TIR optical elements also suffer from interface losses (reflections at the interface between air and the optical media or vice versa) and "lost" light that hits the sidewalls of the optic and passes through the sidewall rather than being reflected.

With example embodiments of the invention, stray light from a TIR optical element is captured and used to improve the overall efficiency of the optical arrangement. As an example, consider a TIR optic with 80% total optical efficiency. If the optic looses 3% of its light in absorption, then the remaining 17% of the optical inefficiency is light that is not lost inside the optical element itself but nevertheless does not leave the solid-state lamp. If 80% of this light could be recaptured and used, the TIR optical element's efficiency could go from 80% to 93.6% (80+17×0.8).

Example embodiments of the present invention improve the optical efficiency of an optical arrangement through the use of a highly reflective diffuse white material. Such a material can possess reflectivity of at least 88%. In example embodiments, such a material is placed adjacent to but spaced apart from a curved sidewall of a TIR optical element. The air gap between the TIR optical element and this highly reflective secondary reflector serves to insure that the internal reflectivity of the optic is not interfered with by the secondary reflector. However, light that escapes by transmission from the TIR optical element is efficiently reflected back into the TIR optical element for another opportunity to eventually be transmitted or reflected from the exit surface of the optic.

In addition to improving efficiency, such an optical arrangement can be useful in enabling a solid state lamp to more closely mimic the light pattern of traditional, directional halogen lamps and incandescent bulbs. Because of the diffuse nature of the secondary reflector and the likelihood of multiple refractions and/or reflections, at least some of the recaptured and repurposed light is emitted from the exit surface of the TIR optic in a pattern providing little contribution to the directed beam portion of the overall light pattern from the lamp. This behavior of the light mimics the portion of light emitted from traditional halogen and incandescent sources, which use silvered reflectors with filaments at the focal point. With such fixtures and bulbs, only the light that bounces off the reflector is actually directed toward the target. The light that exits such a bulb directly from the filament is uncontrolled with respect to direction.

Shown herein are example embodiments of LED solid-state replacement lamps using an optical arrangement as described above. It cannot be overemphasized that these detailed embodiments are provided as examples only and that a luminaire, lighting system or lamp that implements an embodiment of the invention can take many forms and be made in many ways. An embodiment of the invention can be developed based on the disclosure herein for many types of directional solid-state lighting.

FIG. 1 is a perspective view of an LED-based, solid-state replacement for a standard, MR16 halogen lamp. Solid state lamp 100 includes TIR optical element 102, which has three lobes. Each lobe corresponds to an LED light source and each light source in this example embodiment includes four LED chips. The honeycomb pattern on the exit surface of TIR optic 102 provides color mixing and control of the beam angle. Lamp 102 also includes aluminum heat sink fins 104 and retention ring 106, which holds various portions of the lamp together. Power supply 108 includes electrical components to provide the proper voltage and current to the LED light sources within lamp 100. Connections pins 110 provide a standard connection to power rails, which in some embodiments are DC supply rails so that power supply 108 only needs to provide the proper voltage. Finally, diffuse, white, highly reflective secondary reflector 112 is provided within the heat sink structure of lamp 100, so that the secondary reflector is substantially adjacent to but spaced a small airgap apart from the curved sidewalls of TIR optical element 102.

Figure 2:
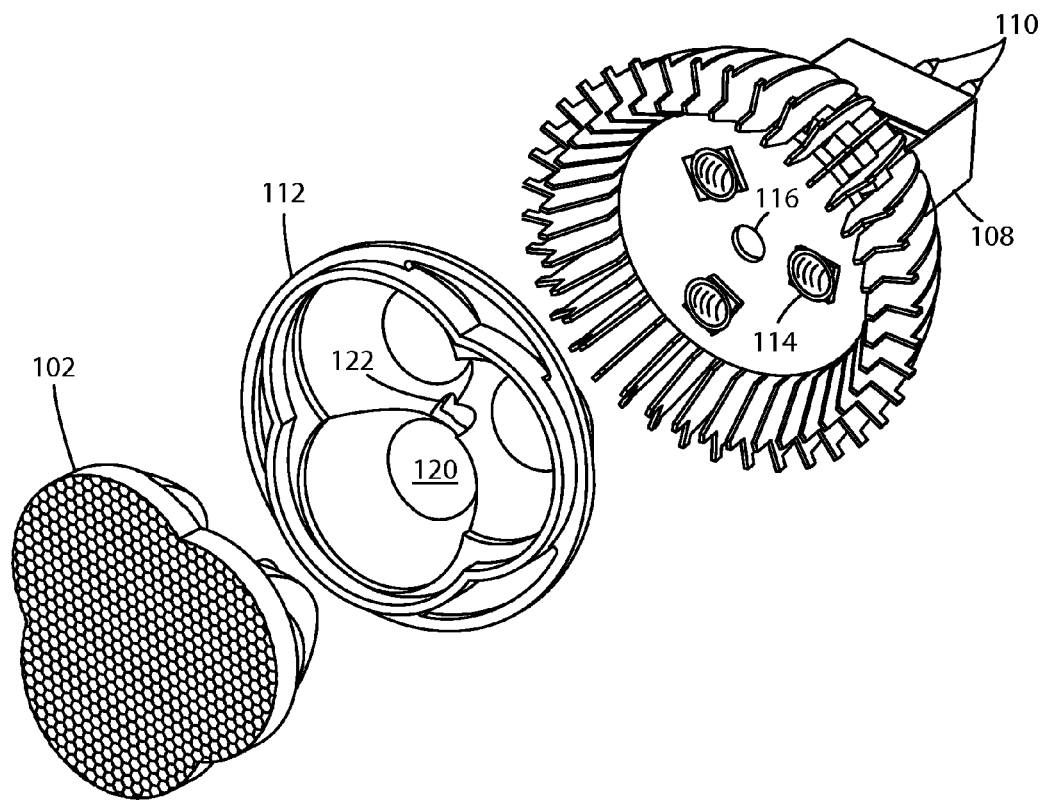
FIG. 2 is an exploded view of the major components of the LED lamp of FIG. 1

FIG. 2 illustrates the base portion of lamp 100, as well as the TIR optic 102 and secondary reflector 112 in an exploded view. Some components are omitted for clarity. The mounting surface inside the lamp for the LED light sources shows the three LED light sources 114 arranged in an array so that each light source corresponds to a lobe of the optical element and the secondary reflector. Recess 116 is provided to seat a portion (see FIG. 3) of the TIR optical element 102, for aligning the LED and the TIR optical element and maintaining an appropriate distance between the TIR optical element and the secondary reflector. Secondary reflector 112 is molded or thermoformed into the desired shape to fit together with the heat sink portion of the lamp and TIR optical element 102. Secondary reflector 112 includes holes 120 through which light passes into the lobes of the TIR optic, and a hole 122 through with a portion of the TIR optical element passes so that the portion can seat properly with recess 116 of the mounting surface inside the lamp.

Figure 3:
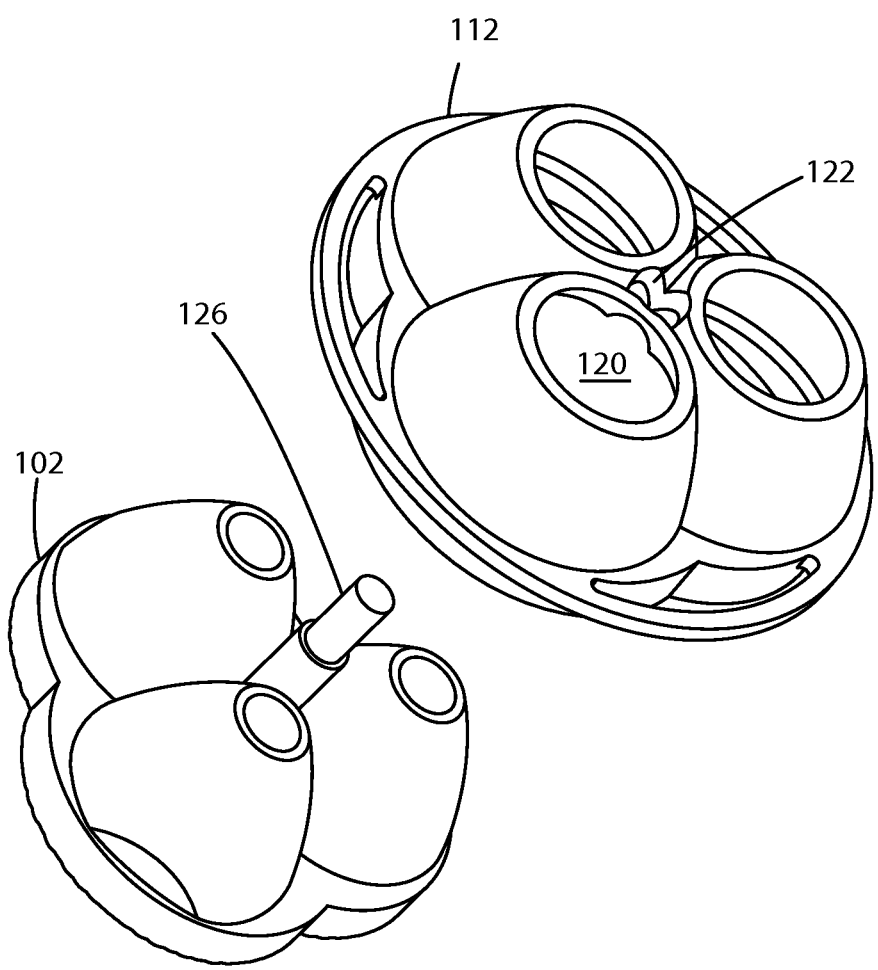
FIG. 3 is a perspective view of the TIR optical element and the secondary reflector that form the optical arrangement of the LED lamp of FIG. 1 according to example embodiments.

FIG. 3 illustrates the "back" sides of TIR optical element 102 and secondary reflector 112. Portion 126 of optical element 102 engages recess 116 in the LED package mounting surface of the lamp base to align the LED and the TIR optical element and maintain the appropriate distance between the TIR optical element and the secondary reflector. The mechanical characteristics and tolerances are adjusted to maintain a small airgap between the curved outer surface of TIR optical element 102 and the white, diffuse, reflective surface of secondary reflector 112. The optical arrangement is effective with a wide variety of airgap distances. The reflector need only be spaced apart from the TIR optic enough to reliably ensure a lack of direct contact. Such spacing could be accomplished by relying only on mechanical tolerances if both parts are molded. The maximum size of the gap is primarily only limited by the size of the lamp. Anything from a few μm up to one half mm can be used while wasting very little space. Anything up to several (2-5) mm would readily work. Also, the secondary reflector need not be conformal to the surface of the TIR optic. For example, a single cone-shaped secondary reflector could be used with the three-lobed TIR optic described above. In such a case, the smallest gap between the outer surface of the TIR optical element and the secondary reflector would be as described above, while some areas would have much larger gaps.

Figure 4:
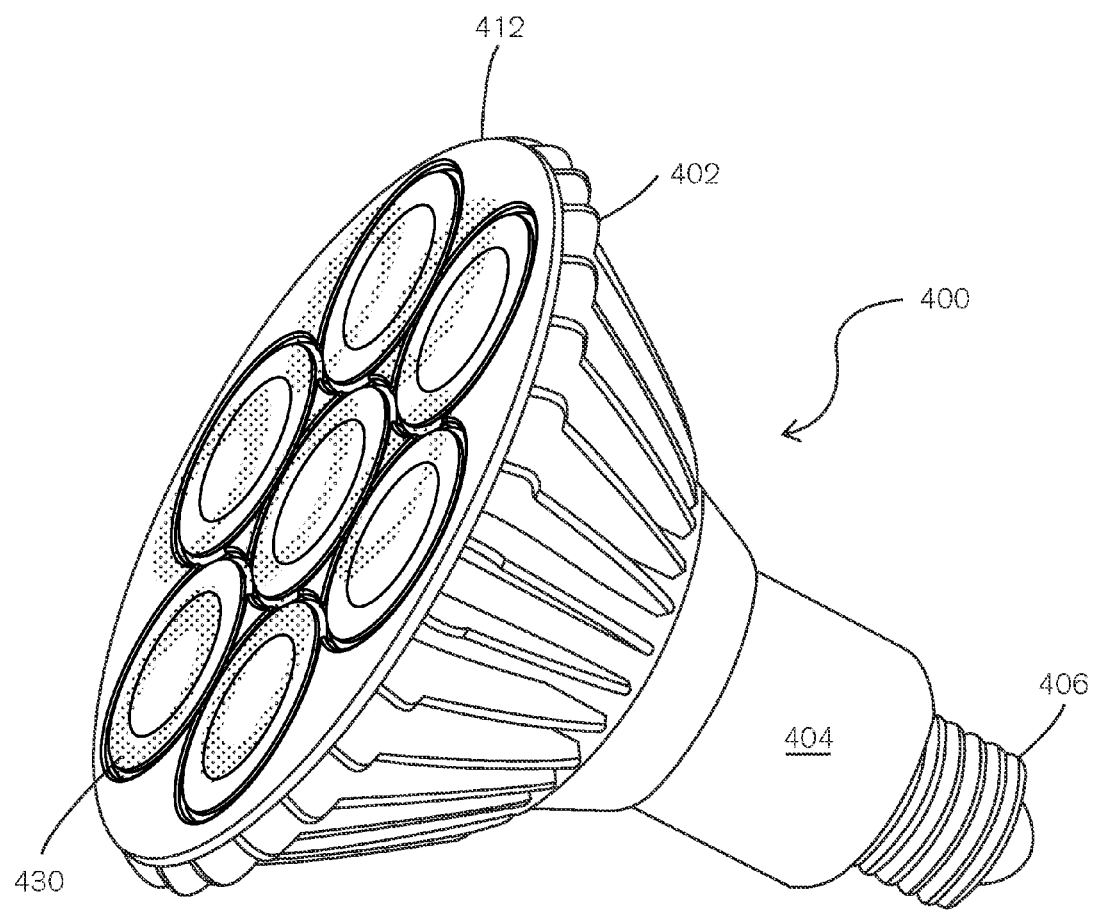
FIG. 4 is a perspective view of an LED lamp according to additional embodiments of the invention. This particular lamp is intended to replace a standard PAR incandescent bulb.

FIG. 4 is a perspective view of a lamp, 400, intended as a solid-state replacement for a standard, PAR type incandescent bulb. Lamp 400 includes a housing with heatsink fins 402, a power supply 404, and an Edison type base 406. In this case, highly reflective, diffuse white secondary reflector 412 includes a plurality of recesses, each containing a TIR optical element 430. In this example embodiment, there are seven recesses and seven optical elements. Each TIR optical element receives light from an LED light source in an array of seven LED light sources mounted on an inside mounting surface (not shown). The optical elements in this particular example embodiment have stepped exit surfaces, however, a variety of shapes and styles of optical element could be used with appropriate minor modifications to the secondary reflector.

Figure 5A:
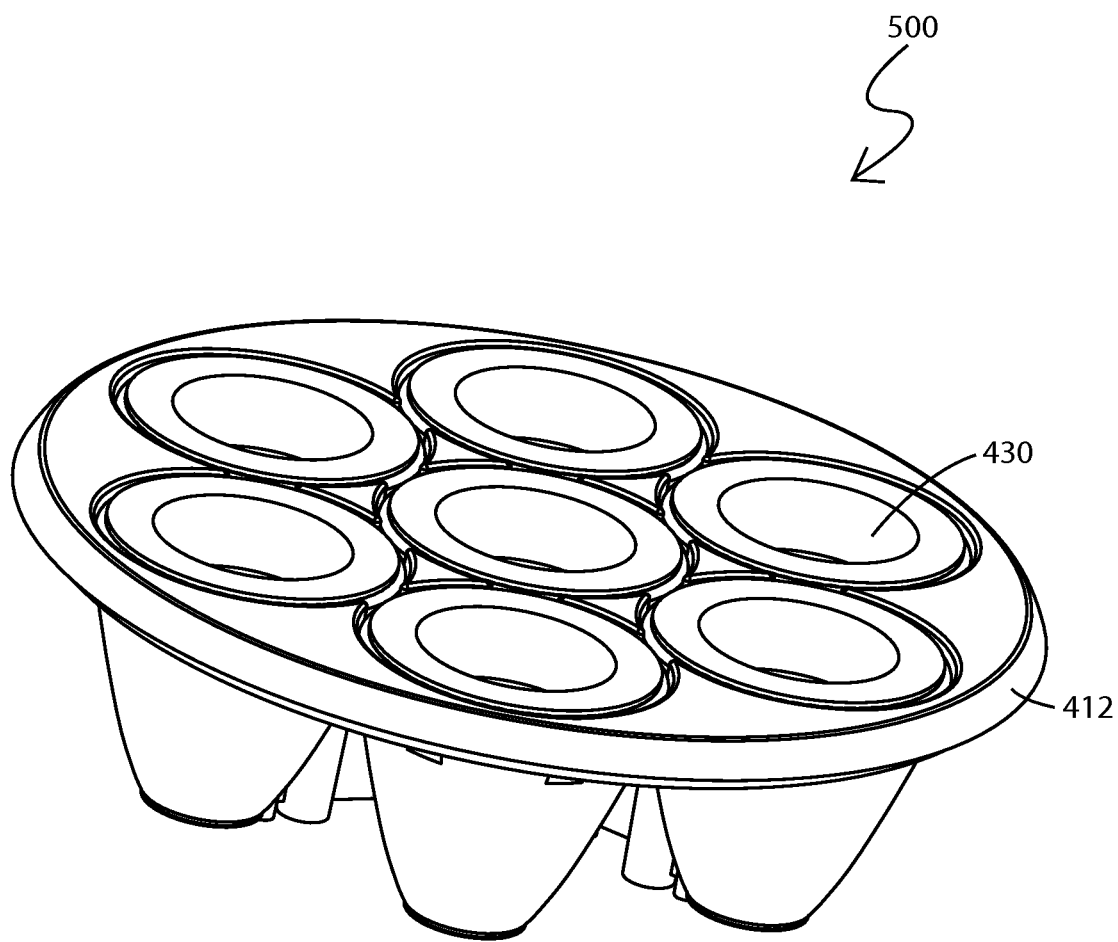
FIG. 5 is a perspective view and a cross-sectional view of the TIR optical elements and the secondary reflector that form the optical arrangement of the LED lamp of FIG. 4 according to example embodiments of the invention. The perspective view is shown in FIG. 5A and the cross-sectional view is shown in FIG. 5B.
Figure 5B:
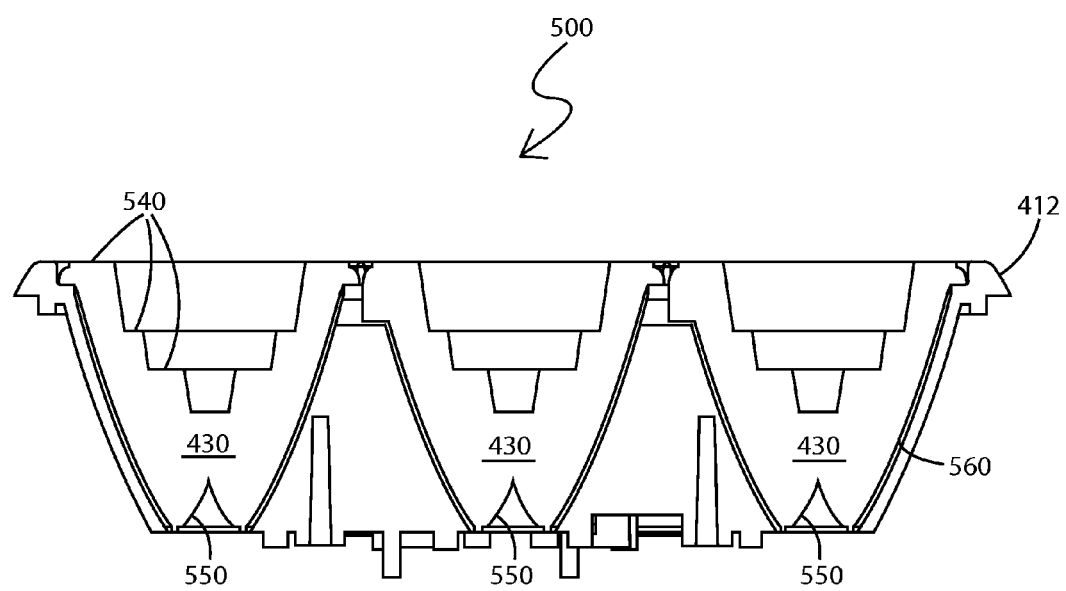

FIG. 5 shows the optical arrangement 500 for the solid-state replacement lamp of FIG. 4. FIG. 5 includes two views. FIG. 5A is a perspective view of optical arrangement 500 and FIG. 5B is a cross-sectional view of optical arrangement 500. In this particular embodiment, TIR optical elements 430 each include a stepped exit surface 540 to reduce material cost and dimples to direct the beam and act as a color mixing treatment. Each TIR optical element also includes a recessed, curved entry surface 550. Airgap 560 is also visible in the cross-sectional view presented in FIG. 5B. Each optical element for lamp 400 is intended to receive light from an LED light source the same or similar to light source 114 of FIG. 2. Molded, TIR optical elements like that shown in FIGS. 4 and 5 are readily available from commercial sources. Many different styles of TIR optical elements could be used with an embodiment of the invention. Another style of TIR optical element that could be used is shown in U.S. patent application Ser. No. 12/776,799, filed May 10, 2010, the entire disclosure of which is incorporated herein by reference.

Various arrangements and types of LED light sources emitting various colors of light can be used with an embodiment of the invention. The LED light sources illustrated include four LED chips packaged on a submount with a lens. At least one of these LED chips is a red-emitting LED, and at least one of other LED chips is packaged with a local phosphor to form blue-shifted yellow LED devices. Such a blue-shifted yellow plus red (BSY+R) system is used to create substantially white light. In some embodiments, the red LEDs, when illuminated, emit light having dominant wavelength from 605 to 630 nm. The LED chips for the BSY devices emit blue light having a dominant wavelength from 440 to 480 nm. The phosphor packaged with the blue LEDs when excited by the impinging blue light, emits light having a dominant wavelength from 560 to 580 nm. This is but one example of light sources that can be used with embodiments of the present invention. Individual LED chips can be used with some or all of the TIR optical elements in an embodiment of the invention, or various numbers and types of LEDs can be combined. Further examples and details of mixing colors of light using solid state emitters can be found in U.S. Pat. No. 7,213,940, which is incorporated herein by reference.

The highly reflective secondary reflector in example embodiments of the invention can be made of various materials. The secondary reflector can be molded from white plastic such as white polycarbonate. Alternatively materials that are thermoformable can be used. Commercially available, generic materials include microcellular polyethylene terephthalate (MCPET) and polycarbide. Such materials can be made with 95% reflectively, and can be procured from sources such as Genesis Plastics, LLC of Jeffersonville, Ind. in the United States. Suitable materials are also available from Sabic Innovative Plastics Holdings of Pittsfield, Mass. in the United States as well as WhiteOptics, LLC of Newark, Del. in the United States. The latter supplier can provide reflective material with 97% reflectivity. A secondary reflector with at least 88% reflectivity works well, and a reflector can be procured with a reflectivity of at least 92%, at least 95% or at least 97%. Some of the example secondary reflectors described herein have diffuse reflective surfaces; however, a secondary reflector with a specular surface can also be used in an embodiment of the invention. A specular secondary reflector can be made of many different materials, including materials that are made reflective by application of a powder coating, reflective paint, or the like.

Embodiments of the invention can use varied fastening methods and mechanisms for interconnecting the parts of the lighting system and luminaire. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An optical arrangement for a solid-state lamp, the optical arrangement comprising:
   a total internal reflection (TIR) optical element including an outer surface with a conic shape that internally reflects light; and
   a highly reflective secondary reflector, substantially conformal to, outside, and spaced a small gap away from the outer surface.

2. The optical arrangement of claim 1 wherein the highly reflective secondary reflector is spaced from a few micrometers to five mm away from the outer surface of the optical element.

3. The optical arrangement of claim 2 wherein the highly reflective secondary reflector is a diffuse white reflector.

4. The optical arrangement of claim 2 wherein the highly reflective secondary reflector is a specular reflector.

5. The optical arrangement of claim 3 wherein the highly reflective secondary reflector comprises thermoformable material.

6. The optical arrangement of claim 3 wherein the highly reflective secondary reflector comprises microcellular polyethylene terephthalate.

7. The optical arrangement of claim 3 wherein the highly reflective secondary reflector comprises polycarbide resin.

8. The optical arrangement of claim 3 wherein at least one of the TIR optical element and the highly reflective secondary reflector comprises a plurality of lobes.

9. The optical arrangement of claim 3 wherein the highly reflective secondary reflector comprises a plurality of recesses corresponding to a plurality of TIR optical elements.

10. The optical arrangement of claim 3 wherein the highly reflective secondary reflector comprises a surface having at least 85% reflectivity.

11. The optical arrangement of claim 10 wherein the highly reflective secondary reflector comprises a surface having at least 92% reflectivity.

12. The optical arrangement of claim 11 wherein the highly reflective secondary reflector comprises a surface having at least 95% reflectivity.

13. The optical arrangement of claim 12 wherein the highly reflective secondary reflector comprises a surface having at least 97% reflectivity.

14. A lamp comprising:
    a light emitting diode (LED) light source;
    a total internal reflection (TIR) optical element including an outer surface with a conic shape that internally reflects light from the LED light source; and
    a highly reflective secondary reflector, substantially conformal to, outside, and spaced a small gap away from the outer surface.

15. The lamp of claim 14 wherein the highly reflective secondary reflector is spaced from a few micrometers to five mm away from the outer surface of the optical element.

16. The lamp of claim 15 wherein the LED light source comprises a plurality of LED packages arranged in an array.

17. The lamp of claim 16 wherein the highly reflective secondary reflector comprises microcellular polyethylene terephthalate.

18. The lamp of claim 16 wherein the highly reflective secondary reflector comprises polycarbide resin.

19. The lamp of claim 16 wherein at least one of the TIR optical element and the highly reflective secondary reflector comprises a plurality of lobes, wherein at least one lobe corresponds to each LED package.

20. The lamp of claim 19 further having a form factor of a standard halogen lamp.

21. The lamp of claim 20 wherein the highly reflective secondary reflector comprises a diffuse white surface having at least 85% reflectivity.

22. The lamp of claim 21 wherein the highly reflective secondary reflector comprises a diffuse white surface having at least 92% reflectivity.

23. The lamp of claim 22 wherein the highly reflective secondary reflector comprises a diffuse white surface having at least 95% reflectivity.

24. The lamp of claim 23 wherein the highly reflective secondary reflector comprises a diffuse white surface having at least 97% reflectivity.

25. The lamp of claim 16 further comprising:
a plurality of recesses in the highly reflective secondary reflector each associated with one of a plurality of TIR optical elements; and
a plurality of LED light sources, each corresponding to one of the plurality of recesses and one of the plurality of TIR optical elements.

26. The lamp of claim 25 further comprising;
a housing having a form factor of a standard incandescent bulb; and
an Edison base.

27. The lamp of claim 26 wherein the highly reflective secondary reflector comprises a diffuse white surface having at least 85% reflectivity.

28. The lamp of claim 27 wherein the highly reflective secondary reflector comprises a diffuse white surface having at least 92% reflectivity.

29. The lamp of claim 28 wherein the highly reflective secondary reflector comprises a diffuse white surface having at least 95% reflectivity.

30. The lamp of claim 29 wherein the highly reflective secondary reflector comprises a diffuse white surface having at least 97% reflectivity.

31. A method of assembling a lamp, the method comprising:
arranging a plurality of light emitting diode (LED) light sources in a pattern within a housing;
positioning a secondary reflector having at least 85% reflectivity near the plurality of LED light sources; and
placing at least one total internal reflection (TIR) optical element to receive light from at least one of the plurality of LED light sources so that a conically-shaped outer surface of the at least one TIR optical element reflects the light and is conformal to, inside, and spaced a small gap away from the secondary reflector.

32. The method of claim 31 wherein the at least one TIR optical element is spaced from a few micrometers to five mm away from the secondary reflector.

33. The method of claim 32 wherein at least one of the TIR optical element and the highly reflective secondary reflector comprises a plurality of lobes, wherein at least one lobe corresponds to each LED light source.

34. The method of claim 33 wherein the lamp has a form factor of a standard halogen lamp.

35. The method of claim 32 wherein the secondary reflector has plurality of recesses and wherein the placing of the at least one TIR optical element further comprises placing one TIR optical element in each recess of the plurality of recesses.

36. The method of claim 35 wherein the lamp has a form factor of a standard incandescent bulb with an Edison base.

* * * * *